Sept. 1, 1925.
E. S. HALL
BINDER POST
Filed April 9, 1925
1,552,147
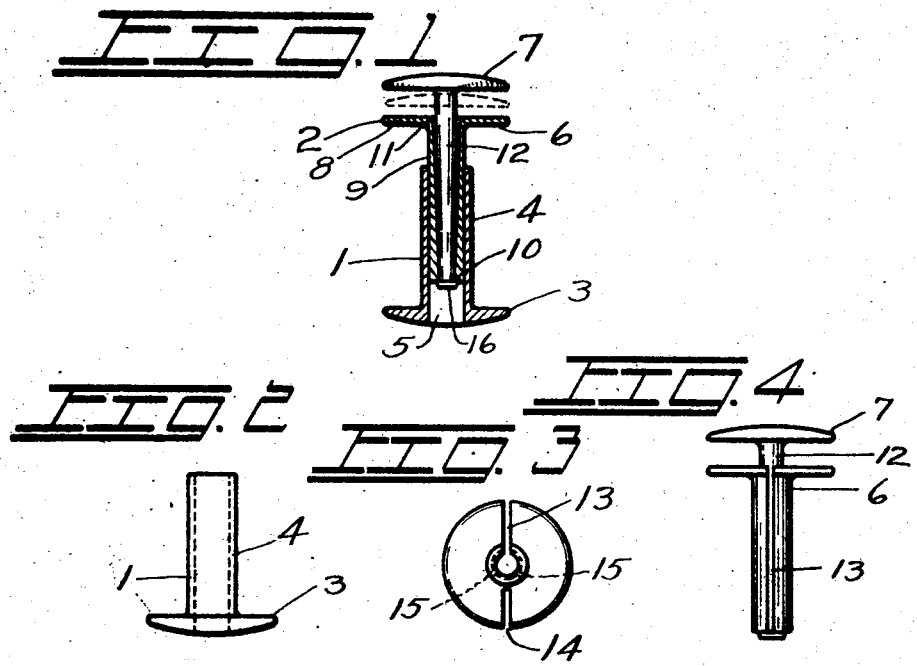
INVENTOR
Edward S. Hall
BY
Harry Bowen
ATTORNEY

Patented Sept. 1, 1925.

UNITED STATES PATENT OFFICE.

EDWARD S. HALL, OF SEATTLE, WASHINGTON.

BINDER POST.

Application filed April 9, 1925. Serial No. 21,750.

*To all whom it may concern:*

Be it known that I, EDWARD S. HALL, a citizen of the United States, residing at Seattle, county of King, and State of Washington, have invented a new and useful Binder Post; and I do hereby declare that the following is a full, clear, and exact specification, such as will enable others skilled in the art to which it appertains to make and use the same.

The invention is a binder post in which the head of the post may be quickly and rigidly held in the base.

The object of the invention is to provide a binder post in which the head may be readily inserted and instantly held in the base.

Another object of the invention is to provide a binder post in which the head is held in the base by a wedge action.

A further object of the invention is to provide a binder post in which the head may be rigidly held in the base in any position.

And a still further object of the invention is to provide a binder post of a simple and economical construction.

With these ends in view the invention embodies a binder post having a head member and a base member. The head member is made in two sections, one having a circular head with a tapering shank, and the other, a circular head with a split tubular shank and the opening in the shank having a slightly greater taper than the shank of the former member. The base member is provided with a circular base and a tubular shank.

Other features and advantages of the invention will appear from the following description, taken in connection with the drawings, wherein:—

Figure 1 is cross section through the center of the post showing the wedge action.

Figure 2 is a side view of the base.

Figure 3 is a plan view of the tubular member of the head looking toward the tubular end.

Figure 4 is a view of the complete head member.

In the drawings I have shown my device as it would be made wherein numeral 1 indicates the base, and numeral 2 indicates the head.

In the design shown in Figure 1, the base is provided with a round flat head 3 and a tubular shank 4 having an opening 5 in its center, the walls of which are straight or parallel.

The head 2 of the design shown in Figure 1 is formed with two members 6 and 7. The member 6 is made with a round flat head 8 having a tubular shank 9, the inner opening of which tapers from the point 10 to the point 11. The member 7 is made with a circular head having a tapering shank 12 which tapers from the outer end toward the head with a taper that is slightly less than the taper in the member 6, and it will be observed that as the member 7 is forced downward until the head arrives at the position shown in dotted lines in Figure 1, the shank 12 will wedge the walls of the tube 9, which are provided with a longitudinal slit 13 as shown in Figures 3 and 4 against the inner surface of the tubular member 4. This will make it possible to positively bind the head to the base with the top of the head at any suitable distance from the base. The head 8 may also be provided with another slot 14 in the opposite side to allow the slot 13 to open and the tubular member 9 may also be provided with slots 15 as indicated in dotted lines in Figure 3 if desired, so that the tubular member may consist of several segments. It will also be observed that the slight difference between the tapers of the members 9 and 12, which difference is exaggerated in the drawing for the purpose of illustrating more clearly, makes it possible for the outer surface of the member 9 to bind against the inner surface of the member 4 along its entire length, since, as the lower end of the member 9 opens slightly, the amount of the taper of its inner surface will assume a slightly smaller angle and this taper will then coincide with that of the member 12. The member 12 is also provided with a small bead 16 to prevent its being removed from the member 6. It will also be observed that when the device is in the locking position or when the member 7 is forced downward to the position shown in dotted lines in Figure 1 there will be a slight space between it and the member 6 so that a knife or the like may be wedged therein to release the device or to raise the member 7.

It will be understood that changes may be made in the construction without departing from the spirit of the invention. One of which changes may be in the peripheral shape of the heads or bases of either of the designs, another may be in the proportionate sizes of the heads and shanks or tubes and still another may be in the use of other means for holding the shanks of the heads in the tubes of the base. It is also understood that this device, which is described, as a binder post may be used for any other purpose for which it may be practicable.

Having thus fully described the invention, what I claim as new and desire to secure by Letters Patent, is:—

1. In a binder post, an outer tubular portion having a flat round head, and an inner compound member having a tubular shank with a flat annular head, said tubular part having a continuous slit through the shank and head at one side and another slit in the head at the opposite side, and having a tapered pin entered through the head of the said inner tubular part with a flat circular head at the outer end, and a bead at the inner end to hold it in the said tubular part and being adaptable to engage a tapering surface of a slightly greater angle on the interior of the said tubular part to spread the shank of the tubular part evenly along its entire length.

2. In a binder post, a tubular member with parallel sides and a round flat head, another tubular member with a round flat head whose outer surface is parallel and is substantially the same diameter as the inner surface of the former tubular member and whose inner surface tapers outwardly from the end of the tubular portion to the head, and the said latter member having a continuous slit through the tubular portion and head, and a tapering pin adaptable to be placed in the said latter member to engage and spread the same equally at all points as it is forced into it, said tapering pin having a round flat head and a means for limiting its outward movement.

3. In a device of the class described, a tubular member with a round flat head, another tubular member adaptable to be placed inside of the former member, having a tapering inner surface, a round flat head and a slit extending continuously through it and its head, and another member adaptable to be placed into the latter member to spread its walls evenly along its entire length.

EDWARD S. HALL.